United States Patent [19]
Park et al.

[11] Patent Number: 5,687,926
[45] Date of Patent: Nov. 18, 1997

[54] SEAT BELT WEBBING LOCK APPARATUS AND ASSEMBLY THEREFOR

[75] Inventors: Jang Won Park; Jong Kak Kim, both of moonmak-ep wonju, Rep. of Korea

[73] Assignee: Sungwoo Corporation, Seoul, Rep. of Korea

[21] Appl. No.: 554,837

[22] Filed: Nov. 7, 1995

[30] Foreign Application Priority Data

Nov. 7, 1994 [KR] Rep. of Korea ............... 94-29057
Oct. 21, 1995 [KR] Rep. of Korea ............... 95-36548

[51] Int. Cl.$^6$ ............................................. B60R 22/405
[52] U.S. Cl. ............................................. 242/383.4
[58] Field of Search ............... 242/383.4, 383.2, 242/383.5; 280/806; 297/478

[56] References Cited

U.S. PATENT DOCUMENTS

| | | | |
|---|---|---|---|
| 3,929,300 | 12/1975 | Lindqvist | 242/383.5 |
| 3,955,774 | 5/1976 | Weman | 242/383.5 |
| 4,099,685 | 7/1978 | Paitula | 242/383.5 |
| 4,135,682 | 1/1979 | Mizuno | 242/383.4 |
| 4,168,810 | 9/1979 | Sack et al. | 242/383.2 |
| 4,422,594 | 12/1983 | Honl | 242/383.4 |
| 4,917,325 | 4/1990 | Strnad | 242/383.4 |
| 5,042,738 | 8/1991 | Mori | 242/383.5 |
| 5,507,448 | 4/1996 | Park et al. | 242/383.4 |

*Primary Examiner*—John M. Jillions
*Attorney, Agent, or Firm*—Banner & Witcoff, Ltd.

[57] ABSTRACT

A webbing lock apparatus and assembly therefor is disclosed, wherein a relative rotation between a hook retainer and a wheel mass connected to a fly wheel causes a hook to move to contact a lock ring so that an inner portion of the ring comes into mesh with a portion of the hook thereby actuating a locking mechanism preventing a webbing of a belt to be unwound from an intermediate portion of a spool, upon the occurrence of an emergency condition. A web sensor spring is adjustable to set an elastic force that determines the duration of the locking operation. The apparatus simplifies the required assembly process and is easy to fabricate, thereby enhancing a product reliability, and cost competitiveness.

22 Claims, 9 Drawing Sheets

SEAT BELT WEBBING LOCK APPARATUS AND ASSEMBLY THEREFOR

CROSS-REFERENCE TO RELATED APPLICATIONS

This application makes reference to, incorporates herein and claims all benefits accruing under 35 U.S.C. 119 from our patent applications entitled SAFETY BELT WEBBING LOCKING DEVICE AND ASSEMBLY SYSTEM earlier filed in the Korean Industrial Property Office on Nov. 7, 1994, and assigned Ser. No. 94-29057 and entitled SAFETY BELT WEBBING LOCKING DEVICE AND ASSEMBLY SYSTEM earlier filed in the Korean Industrial Property Office on October 1995 and assigned Ser. No. 95-36548 by that Office.

BACKGROUND OF THE INVENTION

1. Field of the Invention

The present invention relates in general to a webbing lock apparatus used in a seat belt system for protecting an occupant, to prevent an occupant-restraining webbing from being unwound in an emergency situation of a vehicle, and more particularly, to an improved seat belt webbing lock apparatus and assembly therefor capable of enhancing manufacturing productivity.

2. Description of the Related Art

Generally, well-known types of webbing lock apparatus, applied to a seat belt system for protecting the occupant of the vehicle, and to immediately wind the end portion of the occupant restraining webbing, are of a webbing sensing type in which an unwinding acceleration of a seat belt is sensed so as to lock a webbing retractor, or a vehicle sensing type in which using a force of inertia a pawl is actuated to perform a lock operation of a retractor when the vehicle inclines. Such types of webbing lock apparatus, provided with an emergency locking mechanism for stopping the unwinding of a webbing when an emergency situation of the vehicle is detected (e.g., a sudden stop, an excess acceleration, a car collision or a crash), and also provided with an automatic locking mechanism for automatically stopping an additional sudden unwinding of the webbing while the occupant is wearing the webbing, have been proposed and introduced in this field. These apparatus may form combination devices for carrying out these respective functions in a vehicle.

These types of apparatus, such as an interlocking device comprised of a plurality of components thereof, are provided with a structure having a sensitive reaction capability such that an instantaneous webbing lock operation can be performed therein. For example, when an unwinding acceleration of a webbing of a belt in a seat belt system is detected to exceed a magnitude of more than a predetermined limit, then a locking mechanism is actuated by an acceleration sensor for locking the belt against unwinding. The acceleration sensor as described above, responsive to a variation in the rotational speed of a hook retainer (rotating at the same speed as the unwinding of the webbing) and a fly wheel mass mounted on an outer face of a raced retainer, causes a hook receiving an elastic force of a sensor spring to control a lock ring. In the mechanism of the acceleration sensor which actuates and releases the overall operation of a webbing lock apparatus, a webbing locking time is closely connected with an interval during which the hook stops the lock ring. In turn, the interval depends on an elastic force of the sensor spring applicable to the hook. That is to say, a relatively strong elastic force of the spring extends the interval.

In the conventional type apparatus, however, having a set location of a sensor spring arranged therein, regulations or industrial standards differing from country to country may require different locking force standards, thus frequently requiting replacement of the sensor spring.

To meet with the above needs, there has been introduced an improved type of webbing retractor whose elastic force of a sensor spring is variable to precisely adjust a preset value of the unwinding acceleration. However, the retractor employs a configuration in such a manner that a sensor spring is mounted on and fixed to a wheel mass, with the elastic force thereof being applied to a fly wheel mass. With this construction, an interlocking operation between the devices becomes unstable, thereby degrading the quality of the apparatus.

In addition, the manual assembly process required for the above retractor increases overheads and decreases product competitiveness.

SUMMARY OF THE INVENTION

Therefore, it is an object of the present invention to provide a webbing lock apparatus for a safety belt of an automobile, which is capable of adjusting a locking time of a belt in accordance with various rules and regulations governing the acceleration value of the unwinding of a safety belt at which locking occurs, and which is easy to fabricate as well as capable of reliably performing the locking function.

It is another object of the present invention to provide a webbing lock apparatus for a safety belt of an automobile, which includes an assembly therefor allowing an enhancement in manufacturing productivity, with an improved fabricability in an automated assembly system, to thereby result in a reduction in cost.

It is still another object of the present invention to provide a webbing lock mechanism in a safety belt system, in which a sensor spring having an adjustable elastic force is mounted on a hook retainer so as to directly apply the force thereto, thereby causing a hook to stop or release a lock ring in response to a time interval set by adjustment of the sensor spring.

It is yet another object of the present invention to provide a seat belt webbing lock apparatus and an assembly therefor, comprising one sub-assembly including a sensor spring, a hook and a hook retainer encompassing the spring, and another sub-assembly unit incorporating a clutch spring, a fly wheel and a wheel mass, which apparatus is simplified in structure and easy to fabricate in an automated production facility.

In order to accomplish the objects and advantages of the present invention, there is provided a webbing lock apparatus for use in a vehicle seat belt system. The apparatus comprises a shaft rotatably mounted to a spool frame. A spool is interlocked with the shaft for rotation therewith. The spool has an intermediate portion for winding thereon, and unwinding therefrom, a seat belt webbing. A ratchet wheel is interlocked with the shaft for rotation therewith. A hook retainer is interlocked with the shaft for rotation therewith. A lock ring is raced on the shaft adjacent the hook retainer. The lock ring has a ratchet portion. A-hook is movably mounted on the hook retainer for selective locking engagement with the ratchet portion of the lock ring. A spring is connected between the hook and the hook retainer, and serves to directly elastically bias the hook out of engagement with the ratchet portion. A flywheel assembly is raced with respect to the shaft and is coupled with the hook for moving the hook into engagement with the ratchet portion, against the bias of the spring, upon relative movement of the flywheel assembly and the hook retainer. In this manner, the lock ring is temporarily coupled for rotation with the shaft. A pawl is coupled to the lock ring such that rotation of the lock ring with the shaft causes the pawl to lockingly engage the ratchet wheel, to thereby temporarily inhibit unwinding of the web.

Description will hereinunder be given of preferred embodiments of the present invention, with reference to the attached drawings.

DETAILED DESCRIPTION OF THE PREFERRED EMBODIMENTS

Figure 1:
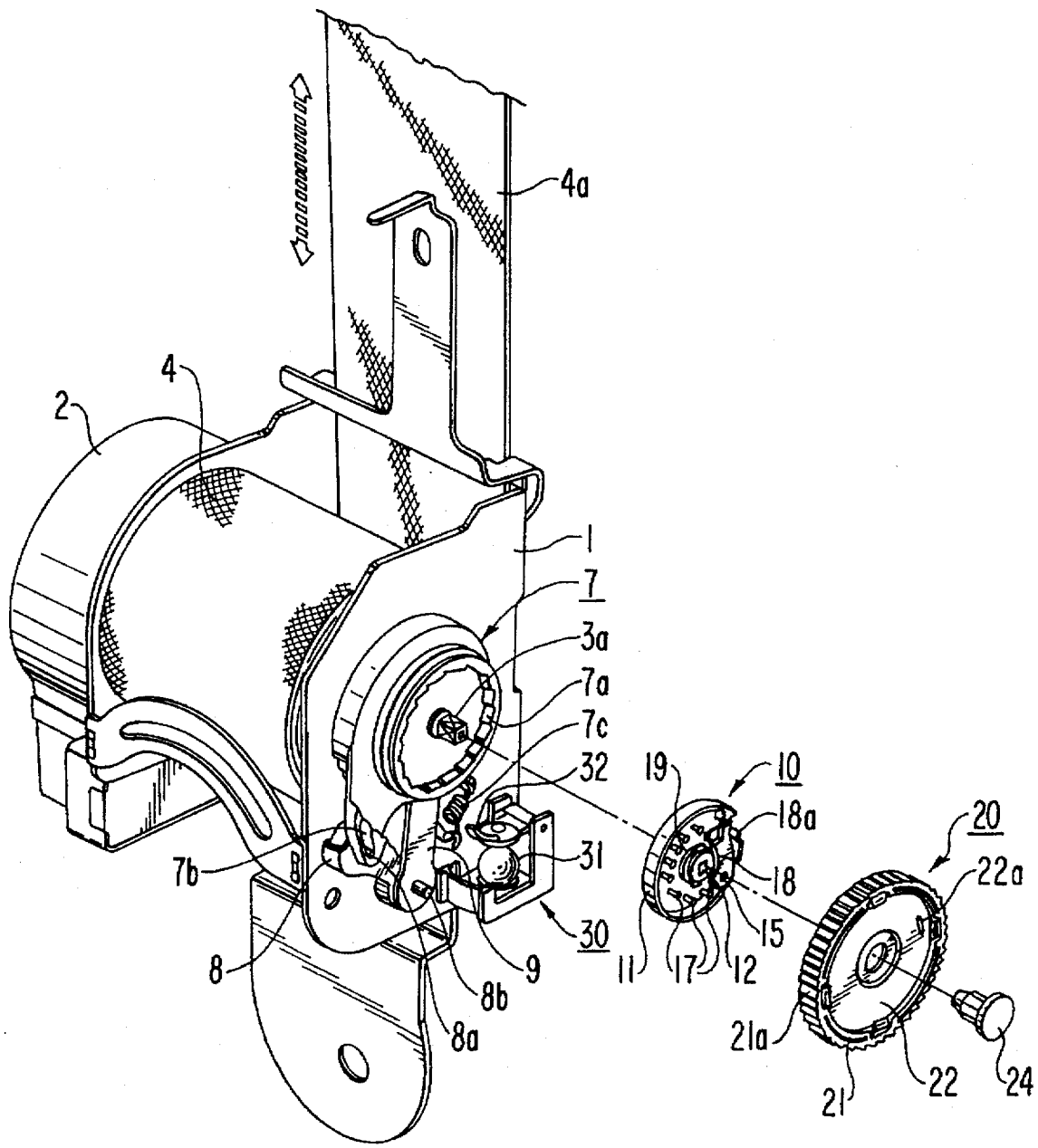
FIG. 1 is an exploded perspective view of a first preferred embodiment according to the principles of the present invention, with parts removed for clarity.
Figure 2:
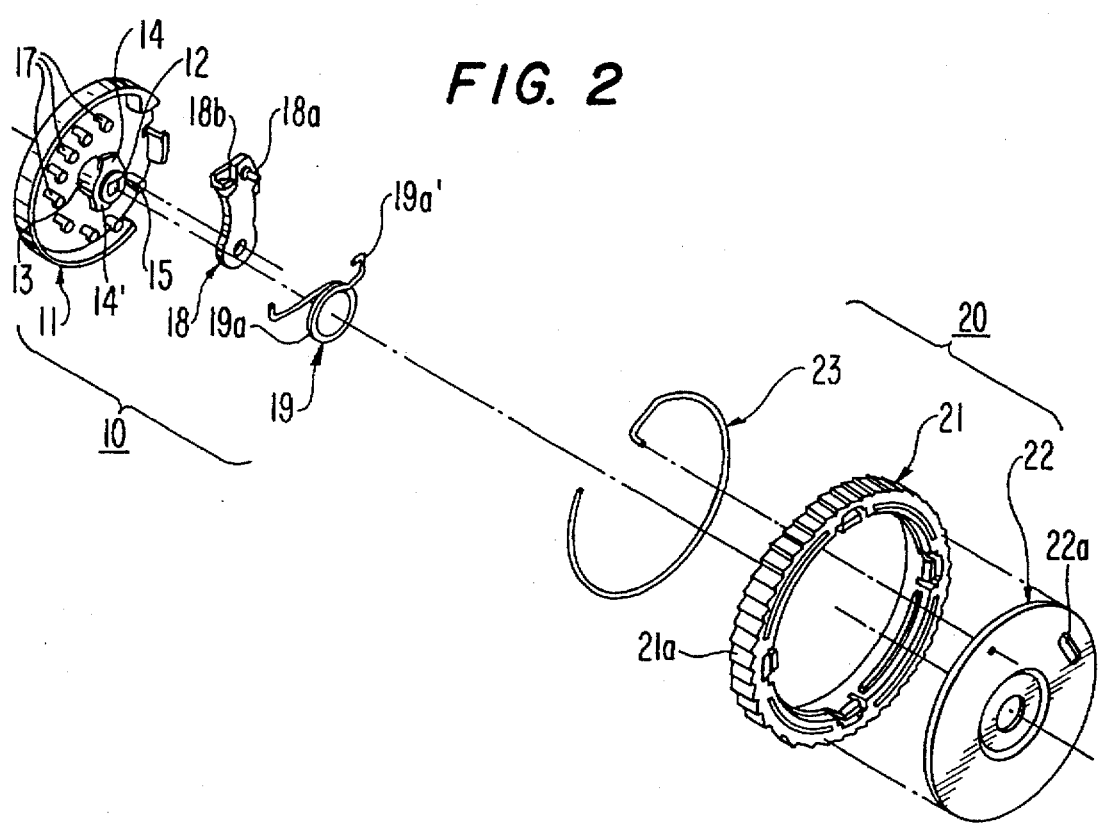
FIG. 2 is an exploded view of sub-assembly of the embodiment of FIG. 1.
Figure 3A:
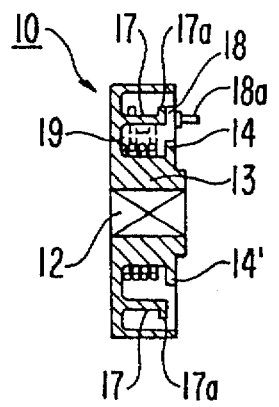
FIGS. 3(a) and 3(b) are cross-sectional views illustrating an assembled retainer unit and an assembled wheel unit, respectively, of the embodiment of FIG. 1.
Figure 3B:
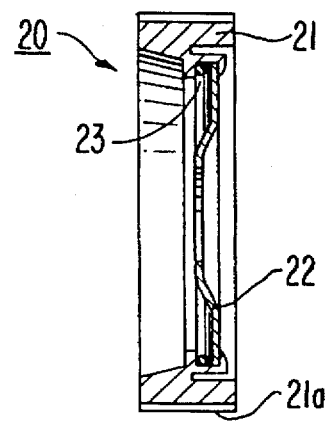

Turning now to the drawings and referring specifically to FIGS. 1 to 7(b), a rewinding apparatus incorporating a spring therein is fixed to one sidewall of a pair of sidewalls of a spool frame 1, and is engagedly connected to a shaft 3. A spool on which one end of an occupant-restraining belt 4 is wound, and from which it is unwound, is rotatably installed coaxially on the outer periphery of an intermediate portion of shaft 3.

A ratchet wheel 6 (see FIG. 4) is fixedly installed on one end portion of shaft 3, adjacent to an outer sidewall of spool frame 1, in parallel thereto, so as to race on the shaft 3. Coaxially mounted with ratchet wheel 6 is a lock ring 7 having an inner ratchet portion 7a and interlocking slot 7b. Lock ring 7 is rotatably installed around a shaft link pivot 3a of shaft 3.

A pawl 8, having a pin 8a interlocking with slot 7b, is installed on a pawl pivot shaft 8b. Lock ring 7 is installed in such a manner that ends of a tie plate 9 are attached, respectively, to shaft link pivot 3a and pawl pivot shaft 8b. Lock ring 7 and tie plate 9 are linked with a return spring 7c serving to bias lock ring 7 against rotation in an unwinding direction of shaft 3.

A retainer unit 10 and a wheel unit 20 are arranged to be installed in the axial direction of shaft link pivot 3, but adjacent to lock ring 7. Retainer unit 10 comprises a hook 18, a hook retainer 11 and a web sensor spring 19. Wheel unit 20 comprises a fly wheel 21, a wheel mass 22 and a clutch spring 23.

Hook retainer 11 includes an axial boss 13 having a rectangular hole 12 in an axial stem of its body, projecting from the bottom face of the retainer 11. A pair of spring protect tabs 14, 14' are provided on the top portion of boss 13. One portion of the inner bottom face of retainer 11, adjacent to the periphery of boss 13, is provided with a hook pivot shaft 15 and an inner stop tab 16. At an opposite portion, around substantially two thirds of the circumference of hook retainer 11, are projected from the bottom face of retainer 11, in arc form, a plurality of spring projections 17, each having a step 17a on a top portion thereof.

Web sensor spring 19 is installed on boss 13 while hook 18, having a projection pin 18a, is rotatably installed on hook pivot shaft 15. Bent end portion 19a of spring 19 is arranged to be hooked to a selected spring projection 17. Bent end portion 19a' is arranged to be hooked to the hook portion 18b (FIG. 2) of hook 18. As a result, an elastic spring force is applied to hook 18 in the direction of closing up both spring arms.

The shaft link pivot 3a extends into rectangular hole 12 so as to locate hook retainer 11 inside the inner ratchet portion 7a of lock ring 7. This causes shaft 3 to rotate together with hook retainer 11.

A wheel mass 22, provided with an elongated slot 22a, is engaged with fly wheel 21. Fly wheel 21 has an outer surface ratchet portion 21a. A clutch spring 23 (FIG. 3(b)) applying a pressing force to wheel mass 22 is installed to complete the wheel unit 20 which, in turn, is arranged to be mounted adjacent to retainer unit 10 by a cap bolt 24 affixed to shaft link pivot 3a. In consequence, the wheel unit may race with respect to shaft 3, around cap bolt 24.

Figure 4:
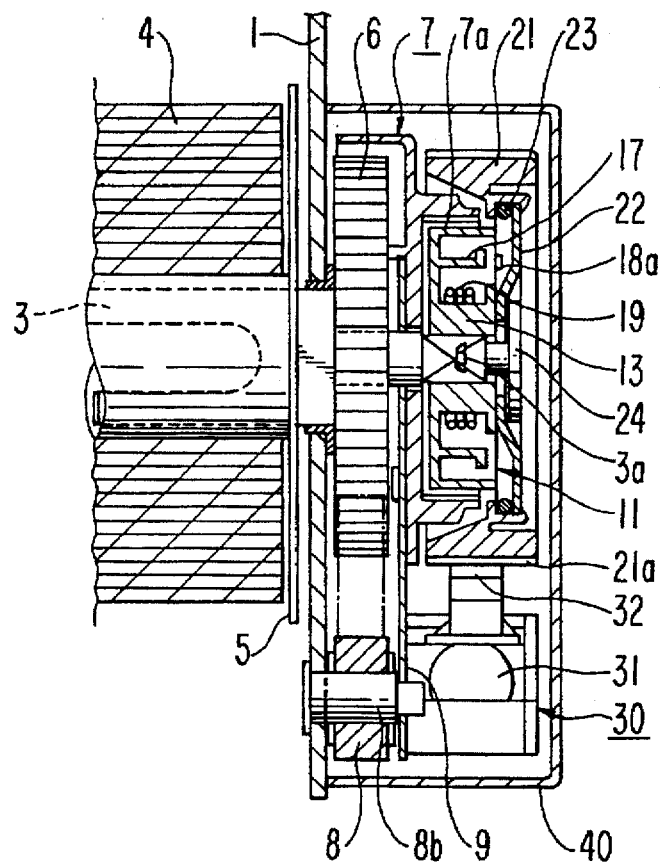
FIG. 4 is an enlarged sectional view of a sub-assembly of the embodiment of FIG. 1.
Figure 5A:
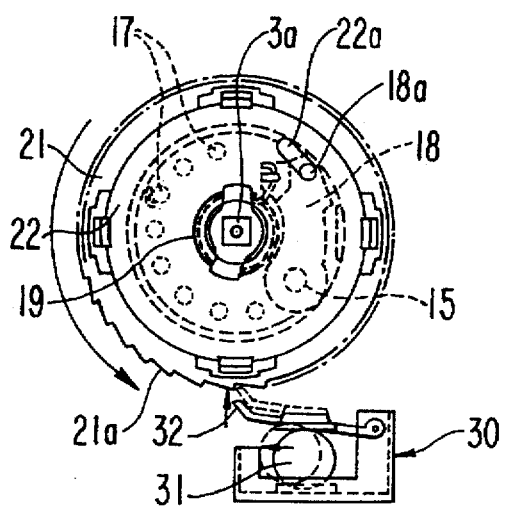
FIG. 5(a) to FIG. 6(b) are fragmentary views illustrating a locking operation of the first embodiment of FIG. 1.
Figure 5B:
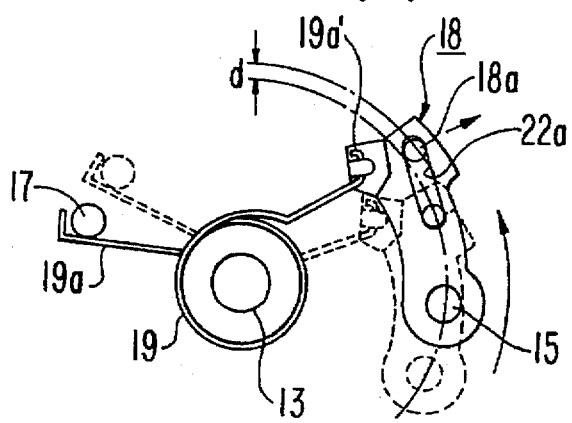

A reference numeral 30 as shown in FIG. 1 denotes a vehicle sensing apparatus in the public domain which is applicable to fly wheel 21. When a vehicle encounters an emergency situation such as a collision, a sudden stop or the like, an inertial force applicable to the apparatus causes ball 31 to move in a forward direction out of its seat, thereby biasing pawl 32 to rotatably come into mesh with outer ratchet potion 21a of fly wheel 21, so as to hinder rotation thereof. In FIG. 4, reference numeral 40 denotes a protective cover for the apparatus.

Referring now to FIGS. 5(a) to 6(b), a locking operation of the first embodiment, for stopping the unwinding of the webbing in an emergency, will be explained.

As illustrated by solid lines in FIGS. 5(a) to 7, in a normal status of the apparatus, hook 18 is arranged to be located inside the inner portion of hook retainer 11 and, therefore, projection pin 18a is arranged to rest at the end of elongate slot 22a (of wheel mass 22) which is closer to hook pivot shaft 15. In this state, hook retainer 11 is free from any constraint of rotation, enabling both shaft 3 and spool 5 to rotate in the webbing-winding direction or the webbing-unwinding direction. Once an emergency situation occurs, for example, a sudden stop, then the upper body of the occupant is put in an abnormal condition wherein an inertial force is initiated to keep the body maintaining a forward velocity. Accordingly, a webbing of a seat belt is rapidly pulled forward in the webbing-unwinding direction such that hook retainer 11 linked to shaft 3 is urged to rotate quickly. On the other hand, wheel mass 22, raced on cap bolt 24, does not immediately rotate with hook retainer 11. This creates a relative rotation between mass 22 and hook retainer 11.

The relative rotation of wheel mass 22 and hook retainer 11 may also occur during an operational process of vehicle sensing apparatus 30. Therein, a biased pawl 32 is forced into engagement with ratchet potion 21a of flywheel 21 by ball 31 moving out of its seat under an inertial force generated by an emergency running situation, whereby rotation of fly wheel 21 is prevented.

In this connection, a relative rotation of wheel mass 22 and hook retainer 11 will occur both where a belt is suddenly unwound or upon a rapid deceleration such as caused by a collision of a vehicle. Both instances will result in a locking of shaft 3, and spool 15 mounted thereon, against rotation.

At such a moment, hook 18 rotating concurrently with hook retainer 11 rotates relative to wheel mass 22. This moves projection pin 18a of hook 18 to the outer end of elongated slot 22a, against the bias of spring 19. In this manner, slot 22a acts as a cam surface for moving hook 18.

Consequently, the outer edge portion of hook 18 rotates about pivot 15 as a center, moving projection pin 18a outwardly by as much as the gap (d) between the inner and outer radius of elongated slot 22. This causes the sharp edge portion of hook 18 to come into mesh with the inner ratchet portion 7a of lock ring 7.

Web sensor spring 19 pulls inwardly, by spring elastic force, the outer ends of hook 18 being forced to move outwardly by movement of pin 18a within slot 22a, such that the magnitude of the spring force determines a time interval during which hook 18 comes into mesh with the internal ratchet portion 7a, i.e., a time for actuating lock ring 7.

Figure 7A:
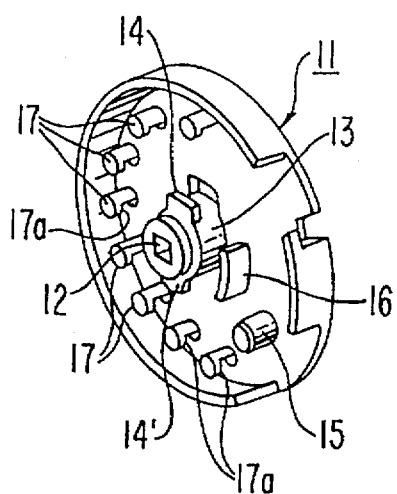
FIG. 7(a) and FIG. 7(b) are, respectively, perspective and front views of a hook retainer of the first embodiment of FIG. 1.
Figure 7B:
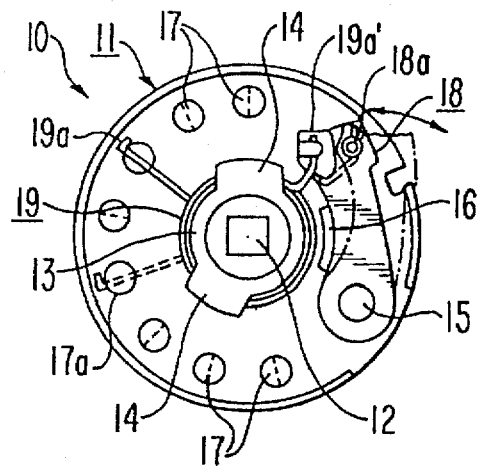
Figure 8:
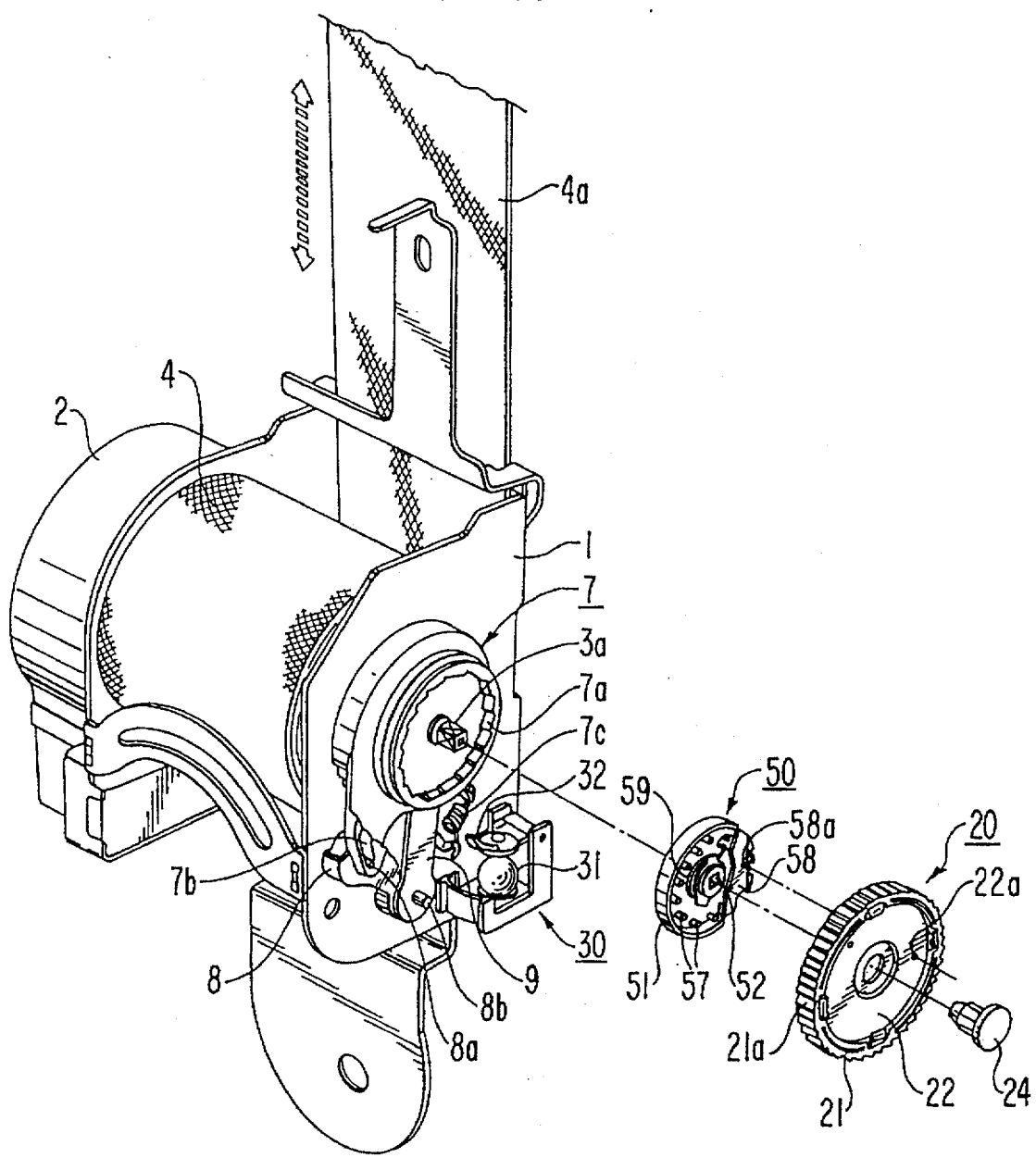
FIG. 8 is an exploded perspective view of a second preferred embodiment according to the present invention.
Figure 9:
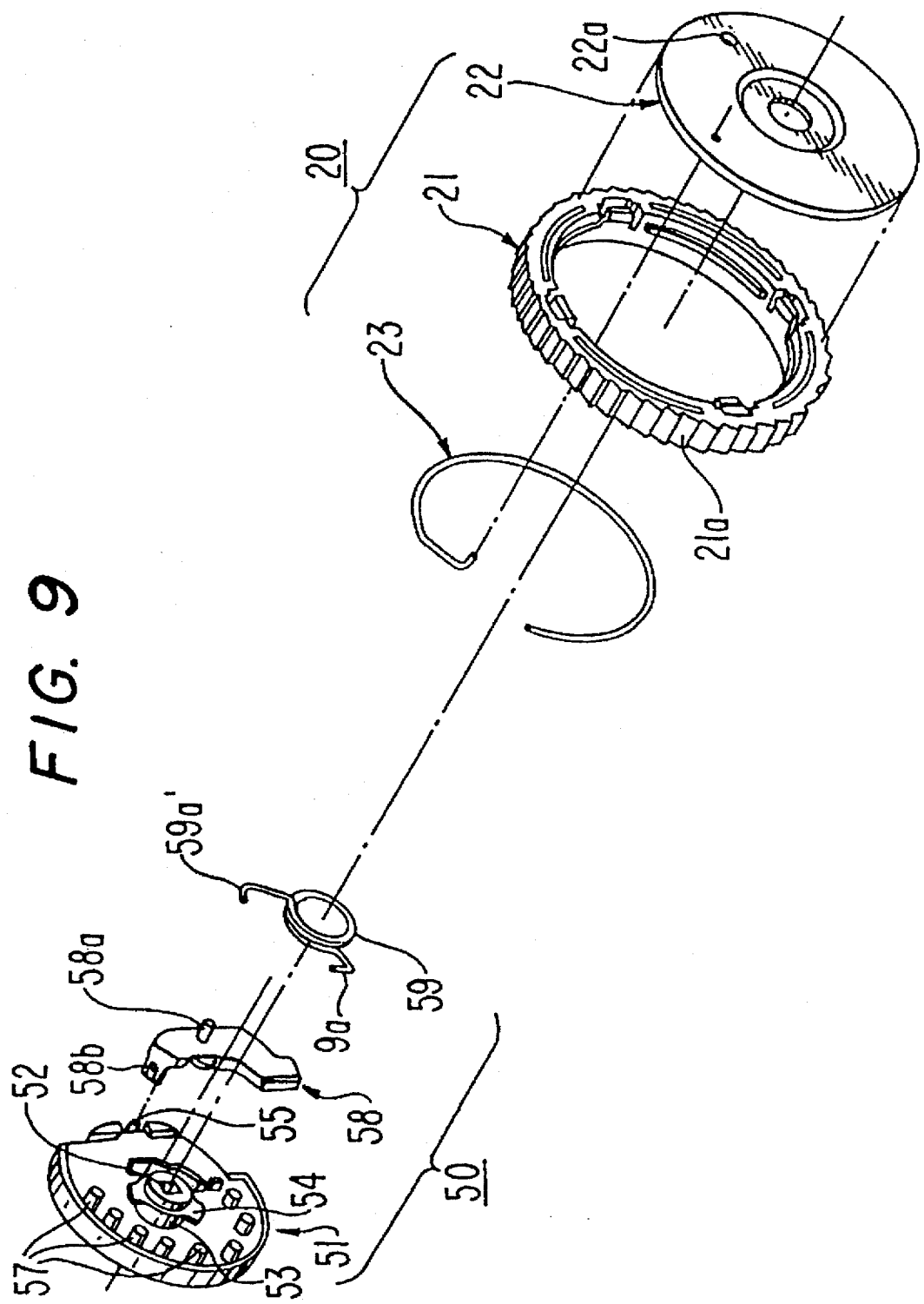
FIG. 9 is an exploded perspective view of a sub-assembly of the second preferred embodiment of FIG. 8.

In more detail, and with reference to FIG. 7(b), as spring hook 19a (which is locked to a lock protrusion 17) is moved closer to hook 18, the spring force is lessened, thereby causing an operation time, during which hook 18 is moved outwardly into engagement with internal ratchet portion 7a, to be shortened, resulting in a prompt locking of webbing 4a.

On the contrary, if spring hook 19a is locked in such a manner as illustrated in phantom lines in FIG. 7(b), the spring force is greater, thereby causing the operation time to be prolonged. With the present invention, by adjusting the locking location of spring hook 19a, the needs of differing governmental regulations may be readily met.

Figure 6A:
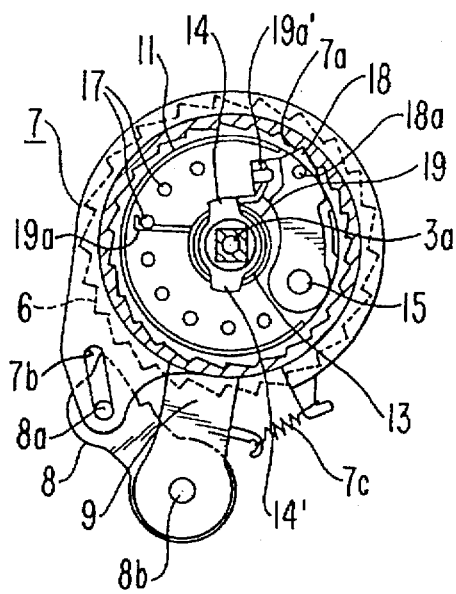
Figure 6B:
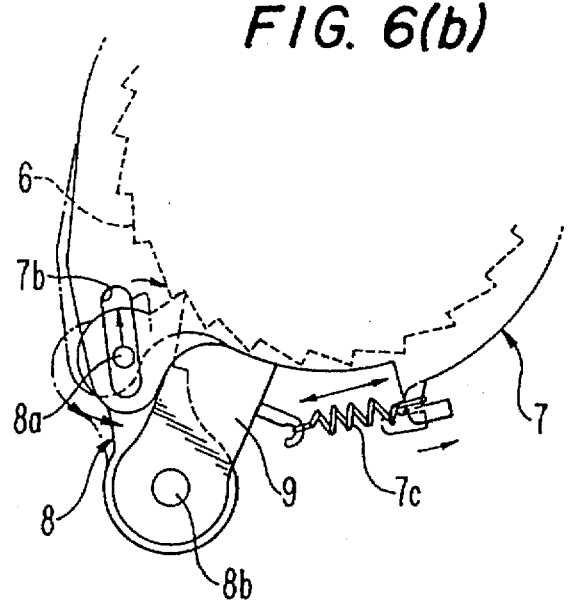

When hook 18 comes into mesh with internal ratchet portion 7a of lock ring 7, a strong and rapid mining effect of the hook retainer is transferred to lock ring 7 to rotate the same slightly as shown in phantom lines in FIG. 6(b). At the same time, interlocking pin 8a of pawl 8 moves upwardly along the path in interlocking slot 7b rotating pawl 8 clockwise around pawl pivot shaft 8b as a center, to thereby lock pawl 8 to ratchet wheel 6 linked with shaft 3.

As a result, ratchet wheel 6 is locked against rotation. Thereby, shaft 3 and spool 5 are in turned to stop an unwinding of webbing 4a of a belt.

However, once the externally applied pulling force is removed, the above forces diminish and, in turn, the restoring forces of return spring 7c and web sensor spring 19 make lock ring 7, hook 18, pawl 8 and ratchet wheel 6 return to their respective initial states, out of locking engagement with each other.

Referring now to FIGS. 8 through 12, a detailed description will be given of a second preferred embodiment of the present invention. Identical reference numerals are used to describe elements common between the first and second embodiments.

A rewinding device 2 having a spring is fixed to one sidewall of a pair of sidewalls of a spool frame 1, and is also engagedly connected to a shaft 3 on which a spool 5 is rotatably installed. Spool 5 winds, and allows unwinding of, a webbing 4a of a seat belt 4, and is rotatably and coaxially mounted an intermediate portion of shaft 3.

Ratchet wheel 6 (see FIG. 10) is fixedly installed adjacent the other sidewall of spool frame 1 and is engaged to shaft 3 such that both are rotatable concurrently. In the axial direction of ratchet wheel 6, a lock ring 7, having an elongated slot 7b and inner ratchet portion 7a, is rotatably installed to race around shaft link pivot 3a as a center. A pawl 8 having an interlocking pin 8a is first installed onto pawl pivot shaft 8b and then a plate 9 is interlocked between shaft link pivot 3a and paw pivot shaft 8b. Lock ring 7 is installed on shaft 3 and is connected with plate 9 by means of a return spring 7c.

Retainer unit 50 and wheel unit 20 are arranged to be installed outside of lock ring 7. Retainer unit 50 comprises a hook 58, hook retainer 51 and web sensor spring 59. Wheel unit 20 comprises a fly wheel 21, wheel mass 22 and clutch spring 23.

Figure 13A:
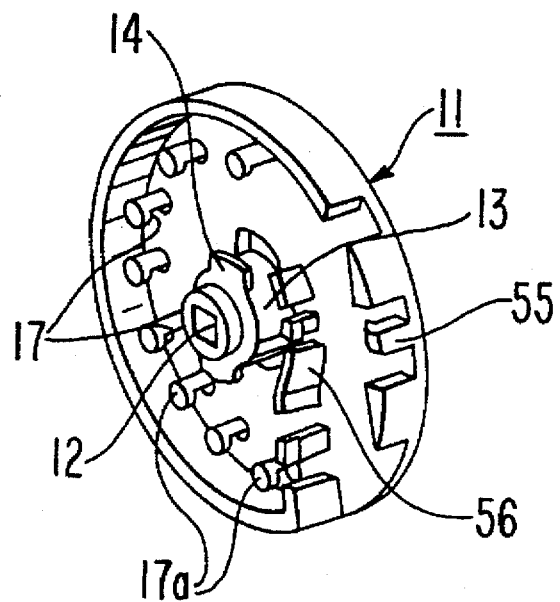
FIGS. 13(a) and 13(b) are, respectively, a perspective view and a front view of a hook retainer of the second embodiment of FIG. 8

Hook retainer 51 has a boss 53 provided with a rectangular pivot hole 52 in a substantially central axial area thereof. An upper portion of boss 53 is provided with a pair of spring protectors 54, 54', respectively. A guide 55 for guiding hook 58 and an elastic stopper 56 (see FIG. 13) are arranged to be positioned on one portion of a bottom face of retainer 51, while a plurality of lock protrusions 57 having respective stop steps 57a around respective upper portions thereof, are extended from another portion of the bottom face. Collectively, protrusions 57 are arranged in an arc form along an inner circumference of hook retainer 51. A web sensor spring 59 is arranged to be installed coaxially on boss 53. Hook 58, having projection pin 58a, is installed between guide 55 and boss 53. A first end portion 59a of spring 59 is arranged to be positioned behind a lock protrusion 57. A second end portion 59a' is arranged to be retained within a lock groove 58b of hook 58, thereby putting hook 58 under spring elastic pressure in the direction of the center of hook retainer 51.

Rectangularly shaped shaft link pivot 3a extends into rectangular pivot hole 52 to couple hook retainer 51 to shaft 3 within inner ratchet portion 7a of lock ring 7. This arrangement causes hook retainer 51 to concurrently rotate with shaft 3.

A wheel mass 22 having at least one hole 22a is engagedly installed on one side of a fly wheel 21 provided with a ratchet portion integrally formed along an outer circumference of the wheel. A clutch spring 23 is pressed and fixedly installed on the outer side of fly wheel 21 to thereby complete the assembly procedure for wheel unit 20. The unit 20 is then installed to race around a locking cap bolt 24 secured onto shaft link pivot 3a beside retainer unit 50.

Figures 10, 11:
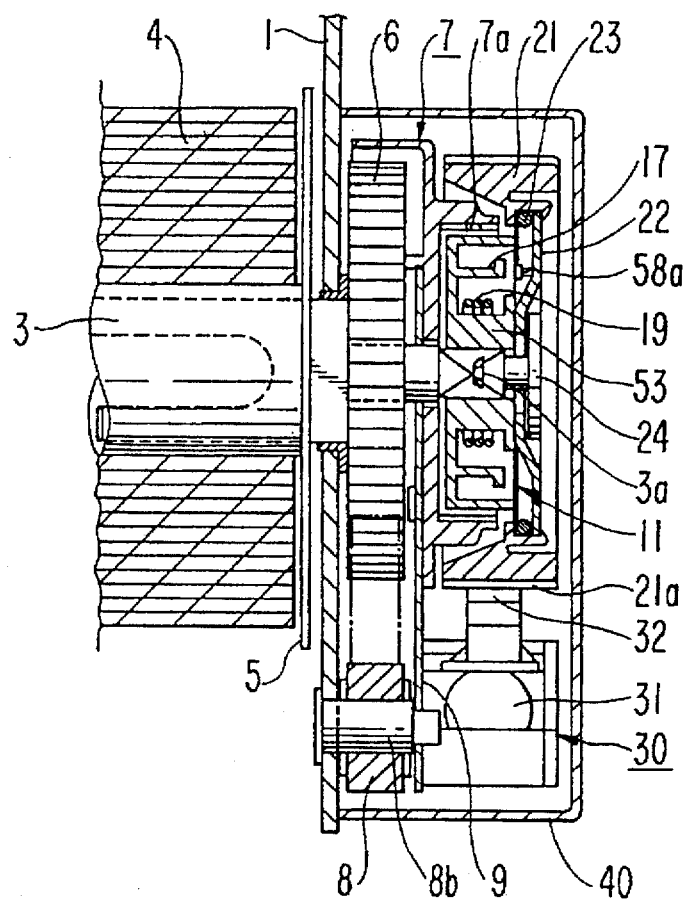
FIG. 10 is an enlarged sectional view of a sub-assembly of the second embodiment of FIG. 8.
FIGS. 11 and 12 are fragmentary views illustrating the operation of the second embodiment, FIG.8.
Figure 12A:
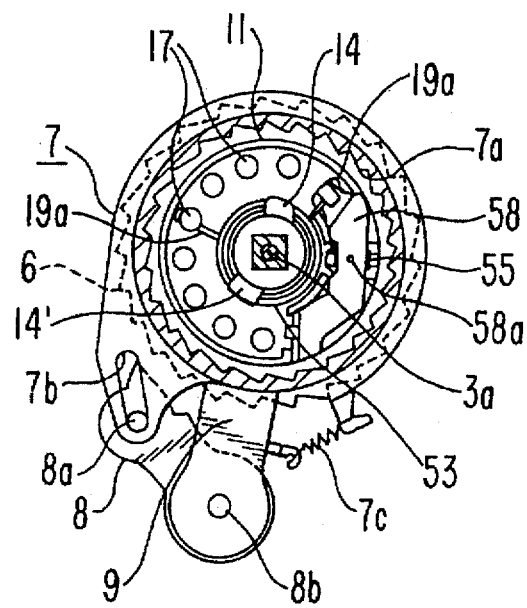
Figure 12B:
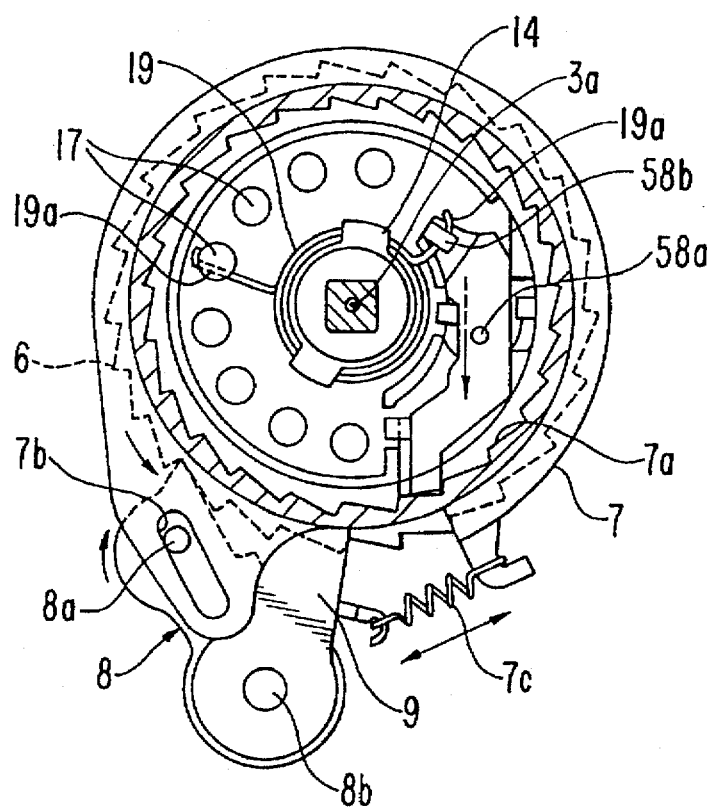
Figure 13B:
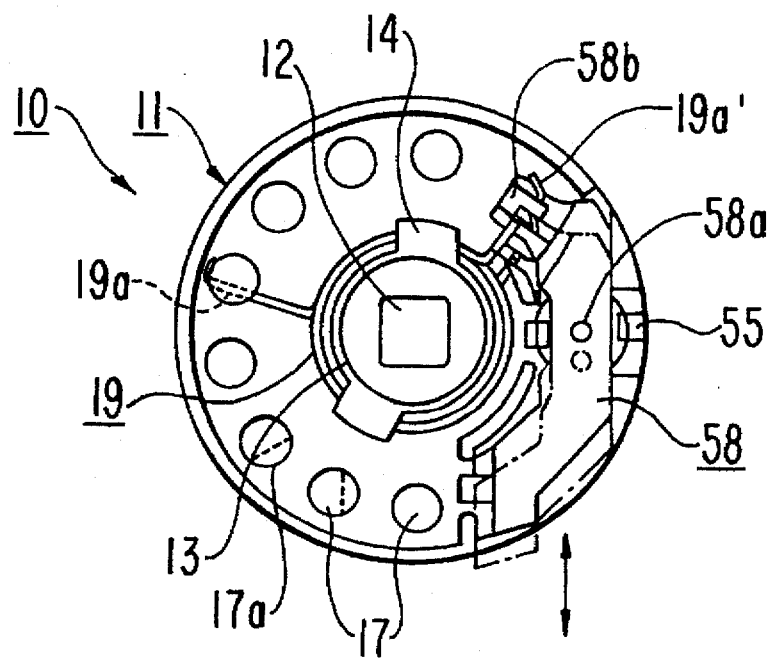

A locking mechanism for stopping the unwinding of the webbing 4a of seat belt 4, on the occasion of an emergency situation of a vehicle, is described and explained in detail with reference to FIGS. 11 and 12. An assembly and the part thereof as depicted by solid lines in FIGS. 10 and 13(b) illustrate a normal state in the ordinary running of a vehicle, in which a hook 58 is arranged to be located inside the inner portion of hook retainer 51, and projection pin 58a is inserted into hole 22a of wheel mass 22 to reside in hole 22a, at a location toward the central portion of mass 22.

In the state as described above, nothing limits the rotation of hook retainer 51, such that webbing 4a of spool 5 may be wound or unwound by interlocking rotation of shaft 3 and spool 5.

An inertial force causing by a sudden move of an occupant in the forward direction due to an emergency situation such as a car collision, pulls the webbing of belt 4 with a sudden jerk so that the unwinding owing to the force causes immediate interlocked rotation of shaft 3 and retainer 51. However, wheel mass 22 does not immediately rotate, and thus relative rotation between retainer 51 and wheel mass 22 occurs.

A vehicle motion sensing device 30 is actuated in the same manner as described and explained in the case of the first preferred embodiment. Namely, upon occurrence of a rapid deceleration, inertial force moves ball 31 out of its seat, thereby actuating pawl 32 to momentarily lock fly wheel 21 against rotation. A relative rotation between hook retainer 51 and wheel mass 22 is created on the occasion of either a sudden unwinding of webbing 4a, or a sudden stop or the like.

Since projection pin 58a of hook 58 is situated within hole 22a, when hook retainer 51 is rotated relative to wheel mass 22, hook 58 is caused to slide outwardly. As a result, hook 58 comes into mesh with the inner ratchet portion 7a of lock ring 7 as illustrated in FIG. 12(b). Web sensor spring 59 biases hook 58 out of contact with the inner ratchet portion 7a, and therefore, the elastic force of the spring 59 determines the time interval during which hook 58 remains interlocked with latch potion 7a.

As described above, a webbing lock apparatus according to the present invention has adapted web sensor spring 19 to directly apply an elastic force thereof to hook 18 (58) so as to secure a stabilized operation and to enhance product reliability. Further, an adjustable mechanism allowing variation of a locking time enables the apparatus to remove any inconvenience or possible danger occurring in an emergency situation, as well as to meet with the requirements of various governmental standards.

In addition, the assembly process according to the present invention makes it possible to enhance product competitiveness by cost saving, reliability and simplified fabricating steps.

What is claimed is:

1. A webbing lock apparatus for use in a vehicle seat belt system, said apparatus comprising:
    a shaft rotatably mounted to a spool frame;
    a spool interlocked with said shaft for rotation therewith, said spool having an intermediate portion for winding thereon, and unwinding therefrom, a seat belt webbing;
    a ratchet wheel interlocked with said shaft for rotation therewith;
    a hook retainer interlocked with said shaft for rotation therewith;
    a lock ring raced on said shaft adjacent said hook retainer, said lock ring having a ratchet portion;
    a hook movably mounted on said hook retainer for selective locking engagement with said ratchet portion of said lock ring;
    a spring connected between said hook and said hook retainer serving to directly elastically bias said hook out of engagement with said ratchet portion, said spring comprising a coil mounted on an axial boss of said hook retainer, and a pair of arms engaged, respectively, with said hook retainer and said hook for providing a continuous biasing force on said hook;
    a flywheel assembly raced with respect to said shaft and being coupled with said hook for moving said hook into engagement with said ratchet portion, against the bias of said spring, upon relative movement of said flywheel assembly and said hook retainer, whereby said lock ring is temporarily coupled for rotation with said shaft;
    a pawl coupled to said lock ring such that rotation of said lock ring with said shaft causes said pawl to lockingly engage said ratchet wheel, to thereby temporarily inhibit unwinding of said web; and
    a plurality of spaced lock members provided on said hook retainer, an arm of said spring being selectively engageable with said lock members in order to vary the spring force biasing the hook out of engagement with said ratchet portion.

2. A webbing lock apparatus according to claim 1, wherein said spring provides an elastic force allowing engagement of said hook and ratchet portion to occur in response to an unwinding acceleration of the web exceeding a predetermined value.

3. A webbing lock apparatus according to claim 1, wherein said lock members comprise lock protrusions extending outwardly from said hook retainer.

4. A webbing lock apparatus according to claim 3, wherein said plurality of lock protrusions are arranged in an arc form adjacent an inner circumferential sidewall of the hook retainer.

5. A webbing lock apparatus according to claim 1, wherein said hook is pivotally mounted on said hook retainer.

6. A webbing lock apparatus according to claim 1, wherein said hook is slidably mounted on said hook retainer.

7. A webbing lock apparatus according to claim 1, wherein said hook is pivotally mounted on said hook retainer.

8. A webbing lock apparatus according to claim 7, wherein said hook retainer comprises a pivot shaft on which said hook is pivotally mounted.

9. A webbing lock apparatus according to claim 1, wherein said hook is slidably mounted on said hook retainer.

10. A webbing lock apparatus according to claim 9, wherein said hook retainer comprises guide means for guiding said hook into and out of engagement with said ratchet potion.

11. A webbing lock apparatus according to claim 10, wherein said guide means comprises a pair of spaced guidewalls and an elastic stopper positioned between said hook and said boss.

12. A webbing lock apparatus according to claim 1, wherein said hook retainer has a stop tab located between said boss and said hook, for preventing interference between said spring and hook.

13. A webbing lock apparatus according to claim 1, wherein said hook retainer has a lock protrusion for engagement with one of said spring arms, the other of said spring arms being engaged with said hook.

14. A webbing lock apparatus according to claim 13, wherein said lock protrusion is stepped to securely hold said one spring arm.

15. A webbing lock apparatus according to claim 1, wherein said boss includes a plurality of spring protect tabs on an outer circumferential sidewall of said boss.

16. A webbing lock apparatus according to claim 1, wherein said flywheel assembly comprises a wheel mass, and said hook has a projection pin received within a hole or slot formed in said wheel mass.

17. A webbing lock apparatus according to claim 16, wherein said wheel mass is secured within a separate flywheel body by a clutch spring.

18. A webbing lock apparatus according to claim 1, further comprising a vehicle motion sensor mechanism, responsive to an inertial force, for locking said flywheel assembly against rotation, whereby the occurrence of an inertial force exceeding a predetermined value, and an unwinding of said web, leads to a relative movement of said flywheel assembly and said hook retainer, said movement causing said lock ring to be temporarily coupled for rotation with said shaft, which rotation causes said pawl to lockingly engage said ratchet wheel, to thereby temporarily inhibit unwinding of said web.

19. A webbing lock apparatus according to claim 18, wherein said vehicle motion sensor mechanism comprises a ball displaceable from a seat under the influence of inertial force, and a second pawl actuated by movement of said ball to move into locking engagement with a ratchet portion of said flywheel.

20. A webbing lock apparatus according to claim 1, wherein said second pawl is pivotally mounted at one end to a tie plate depending from said shaft, and is coupled to said lock ring at an opposite end.

21. A webbing lock apparatus according to claim 20, wherein said second pawl has a pin which is received within a slot formed in said lock ring.

22. A webbing lock apparatus according to claim 20, wherein said lock ring is biased against rotation in an unwinding direction of said shaft by a spring connected between said lock ring and said tie plate.

* * * * *